Patented Aug. 25, 1925.

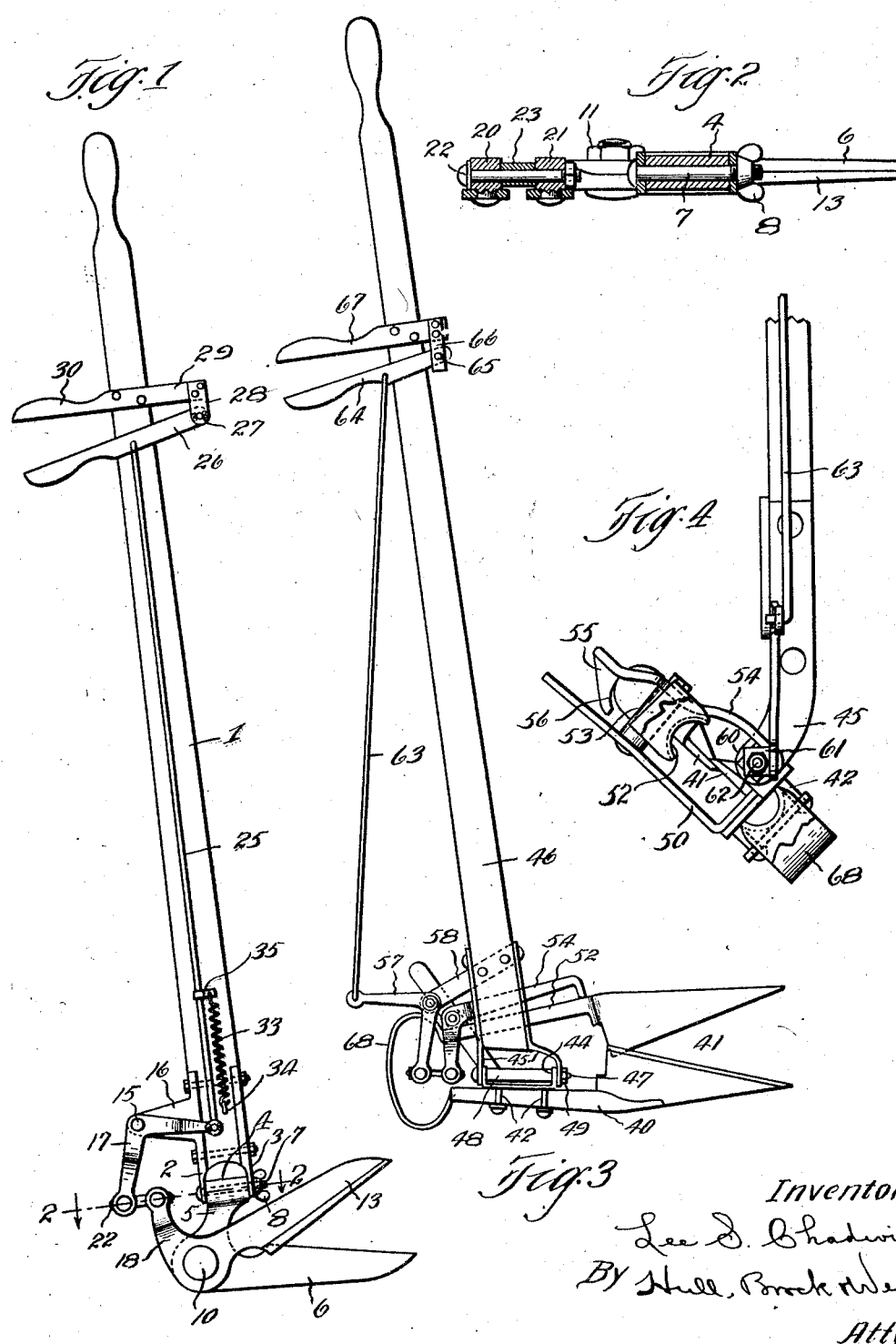

1,551,237

UNITED STATES PATENT OFFICE.

LEE S. CHADWICK, OF SHAKER HEIGHTS VILLAGE, OHIO.

GRASS SHEARS.

Application filed August 16, 1923. Serial No. 657,665.

*To all whom it may concern:*

Be it known that I, LEE S. CHADWICK, a citizen of the United States, residing at Shaker Heights Village, in the county of Cuyahoga and State of Ohio, have invented a certain new and useful Improvement in Grass Shears, of which the following is a full, clear, and exact description, reference being had to the accompanying drawings.

The aim of my invention is to provide a simple and comparatively cheap implement by means of which a user is enabled to conveniently clip the grass along the edge of a walk or drive or about trees, shrubbery, or other objects while walking or standing in a substantially upright position.

In trimming grass along the edge of a walk or similar place it is sometimes desirable to have the plane of the blades substantially vertical, while it is necessary to have them in a horizontal plane, when trimming about trees and shrubbery. A further object, therefore, is to provide an implement of the aforesaid nature wherein the blades are angularly adjustable with respect to the handle so that they may be set to operate to the best advantage under all conditions.

In one of the herein illustrated embodiments of my invention I employ ordinary grass shears and, in connection therewith a further object is to provide means which will maintain the cutting blades in shearing contact with each other from heel to toe.

In the accompanying drawing, Fig. 1 is a side elevation of the present preferred embodiment of the invention; Fig. 2 is a section on the line 2—2 of Fig. 1; Fig. 3 is a side elevation of another form of the invention; and Fig. 4 is a fragmentary left hand elevation of the implement shown in Fig. 3 with the shears adjusted to an angle of about 45° from the plane of the handle.

As to the form of the invention illustrated in Figs. 1 and 2, the implement is so constructed as to provide, at the lower end of the handle 1, a yoke between the opposed branches 2 and 3 whereof is adapted to be clamped a hollow boss 4 which is shown as formed integral with the shank 5 of what I shall term the stationary blade 6. The clamping of the boss 4 to the branches 2 and 3 is effected through a bolt 7 that is extended through the bore of the boss 4 and through registering apertures in said branches. A wing-nut 8 is shown as applied to the threaded end of the bolt 7 so that the pressure of the branches upon the ends of the boss may be conveniently regulated.

Pivotally connected to the heel of the stationary blade 6, as by means of a bolt 10 to which a nut 11 is applied, is the corresponding portion of a movable blade 13.

Pivoted at 15, to a bracket 16 that extends rearwardly from the lower end of the handle 1, is the angle of a bell crank 17. The free end of the vertically disposed branch of the bell crank 17 lies adjacent the end of the shank 18 of the movable blade 13. Pivot blocks 20 and 21 (Fig. 2) are rotatably mounted in said ends and are connected together by a bolt 22. A thrust collar 23 is applied to the bolt 22 and fits between the pivot blocks 20 and 21.

As will be readily seen from Figs. 1 and 2, the bolts 22 and 7 are in axial alignment so that regardless of the angular position of the plane of the blades with respect to the handle 1, the pivot blocks 20 and 21 will bear substantially the same relation to each other at all times. Consequently, no interference will be experienced from this source in the adjustment of the blades with respect to the handle.

The free end of the horizontal branch of the bell crank 17 is connected, through a link 25, with a lever 26 that is pivoted at 27 to a member 28 which depends from an extension 29 of a grip 30 that is secured to the handle 1 a suitable distance from its upper end. A spring 33, which has one of its ends anchored at 34 to the handle 1 and its opposite end connected through a clip 35 with the link 25, tends to draw the link downwardly thereby to swing the lever 26 away from the grip 30 and, through the intervention of the bell crank 17, to retain the blade 13 in open position as shown in Fig. 1.

When it is desired to use the implement the blades are adjusted to the desired angular position with respect to the handle 1, the nut 8 being screwed up tightly enough to hold the parts in the adjusted position. The operator then grasps the upper end of the handle 1 with his left hand and clasps the grip 30, and the free end of lever 26, with his right hand. By alternately opening and closing his right hand he oscillates the lever 26 and imparts, through the link 25, bell crank 17 and thrust collar 23, a similar movement to the blade 13, the spring 33 opposing the hand action. Therefore, through an operation similar to that of manipulating ordinary grass shears, the user is enabled to conveniently manipulate the shears incorporated in the implement.

Turning now to the form of the invention illustrated in Figs. 3 and 4, one of the grips 40 of an ordinary pair of grass shears 41 is secured, by means of screws or bolts 42, to a shallow U-shaped member 44 that is engaged between branches 45 which depend from the handle 46. The ends of member 44 and the branches 45 have aligned apertures through which a bolt 47 extends, the bolt having applied to it a tubular spacer 48 and the branches 45 may be clamped with the proper degree of pressure against the member 44 by means of a nut 49 that is applied to the threaded end of the bolt 47.

A bracket 50 extends laterally from the member 44, and a suitable distance from said member is turned at right angles into a plane substantially parallel to the plane of the shears 41. Adjacent the grip 52 of the shears, said bracket carries a post 53 whereon is pivoted a bell crank 54, the longer branch of which extends out over the grip 52 and terminates at its free end in a finger 55 which has an inwardly curved portion 56 that engages the grip near its outer end where it joins the blade. A second bell crank 57 is pivotally connected at its angle to the outer end of an arm 58 that extends rearwardly and downwardly from the handle 46. Pivot blocks 60 and 61 are rotatably mounted on the lower ends of the substantially vertical branches of the respective bell cranks 54 and 57, and said blocks are connected together by a bolt 62. This bolt and the previously mentioned bolt 47, are in axial alignment at all times regardless of the angular position of the shears with respect to the handle. The opposite end of the bell crank 57 has connection, through a link 63, with a lever 64 that is pivoted at 65 to a member 66 which depends from the adjacent end of a grip 67 that is secured to the handle 46.

The shears 41 are normally retained in open position through the inherent resiliency of the spring loop 68 through which the grips 40 and 52 are connected together. When the lever 64 is drawn toward the grip 67 it rocks the bell crank 57 upon its pivot, and this action is communicated to the bell crank 54 through the bolt 62 and is such as will cause the free end of the longer branch of the latter bell crank to be depressed, thereby to close the shears.

Attention is now called to the fact that the branch of the bracket 50 whereon the post 53 is mounted is turned slightly out of parallelism with the plane of the shears, and this results in the post being inclined somewhat and in the bell crank being tilted. As a consequence the finger 55 is caused to slide laterally over the grip 52 as the shears approach a closed position until the inwardly curved portion 56 of said finger comes into contact with the grip and presses the blade carried by said grip more firmly into contact with the other blade as the points of the blades are brought together. This effects a uniform lateral pressure between the blades from heel to toe and insures cutting action from end to end.

The free end of the bracket 50 may be utilized conveniently while adjusting the shears with respect to the handle by the operator's engaging it with his foot as he manually swings the handle to the desired position.

Having thus described my invention, what I claim is:

1. In an implement of the character set forth, the combination of a handle, a blade pivotally connected to one end of the handle whereby the blade may be angularly adjusted with respect to the handle, a second blade operatively connected to the first blade and constituting therewith a shears, a member pivoted to the handle, operative connections between said member and the second blade involving a pivotal connection that is in axial alignment with the pivotal connection between the handle and the first mentioned blade, an operating device associated with the end of the handle remote from the shears, and a link connecting said device with the aforesaid member.

2. In an implement of the character set forth, the combination of a handle, a blade pivotally connected to one end of the handle whereby the blade may be angularly adjusted with respect to the handle, means for securing the blade in any adjusted position with respect to the handle, a second blade supported in operative relation to the first blade and constituting therewith a shears, a member pivoted to the handle, operative connections between said member and the second blade involving a pivotal connection that is in axial alignment with the pivotal connection between the handle and the first mentioned blade, an operating device movably connected to the handle adjacent its end remote from the shears, a link connecting said device with the aforesaid member, and a spring tending to open the shears.

3. In an implement of the character set forth, the combination of a handle having a yoke at its lower end, a blade, a part connected to said blade and disposed between the branches of said yoke, a pivot member extending through registering holes in the branches and said part thereby to pivotally connect the blade to the handle, a second blade operatively connected to the first blade and constituting therewith a shears, a bell crank pivoted to the lower end of the handle and having a depending branch and a second branch lying alongside the handle, a pivot block rotatably connected to the free end of the first mentioned branch, a member having one of its ends journaled within said pivot block, said member being substantially in axial alignment with the aforesaid pivot member, the opposite end of said member having operative connection with the second blade, a link extending up alongside the handle and having its lower end pivotally connected to the second branch of the bell crank, and means for reciprocating the link.

4. In an implement of the character set forth, the combination of a handle, a grass shears of standard type adjustably connected thereto, operating mechanism carried by the handle, and operative connections between said mechanism and the shears, said connections involving means effecting substantially uniform cutting action between the blades of the shears from end to end thereof.

5. In an implement of the character set forth, the combination of a handle, a grass shears of standard type, pivotal connection between one grip of said shears and the handle, operating mechanism carried by the handle, and pivotal connection between said mechanism and the other grip of the shears, said pivotal connections being substantially in axial alignment.

6. In an implement of the character set forth, the combination of a handle, a grass shears of standard type, a member secured to one of the grips of the shears, pivotal connection between said member and one end of the handle, a bell crank pivoted to a part of said member adjacent the rear end of the other grip of said shears and having one branch which extends out alongside said grip to a point adjacent its forward end, the other branch having its free end disposed adjacent the pivoted connection between the aforesaid member and the handle, the free end of the first mentioned branch of said bell crank having a finger which engages the adjacent grip of the shears in such manner as to effect substantially uniform cutting action between the blades from end to end, a second bell crank pivoted to the handle and having one of its branches adjacent the second mentioned branch of the first bell crank, pivotal connections between said branches, said connections being in axial alignment with the connections between the handle and the aforesaid member, an operating element movably connected to the handle adjacent its end remote from the shears, and a link connection between said element and the other branch of the second mentioned bell crank.

In testimony whereof, I hereunto affix my signature.

LEE S. CHADWICK.